(12) United States Patent
Cabrera et al.

(10) Patent No.: US 10,377,645 B2
(45) Date of Patent: Aug. 13, 2019

(54) UREA-BASED SYSTEM FOR ENERGY AND WASTE RECOVERY IN WATER RECYCLING

(75) Inventors: Carlos R. Cabrera, San Juan, PR (US); Eduardo Nicolau, Toa Alta, PR (US); Michael Flynn, Corte Madera, CA (US); Kai Griebenow, Trujillo Alto, PR (US)

(73) Assignee: University of Puerto Rico, San Juan, PR (US)

(*) Notice: Subject to any disclaimer, the term of this patent is extended or adjusted under 35 U.S.C. 154(b) by 43 days.

(21) Appl. No.: 13/602,092

(22) Filed: Aug. 31, 2012

(65) Prior Publication Data

US 2014/0061127 A1 Mar. 6, 2014

(51) Int. Cl.
| C02F 1/44 | (2006.01) |
| C02F 9/00 | (2006.01) |
| C02F 1/66 | (2006.01) |
| C02F 3/00 | (2006.01) |
| C02F 3/10 | (2006.01) |
| C02F 3/34 | (2006.01) |

(52) U.S. Cl.
CPC ............ *C02F 1/44* (2013.01); *C02F 9/00* (2013.01); *C02F 1/441* (2013.01); *C02F 1/445* (2013.01); *C02F 1/66* (2013.01); *C02F 3/005* (2013.01); *C02F 3/106* (2013.01); *C02F 3/342* (2013.01); *C02F 2201/001* (2013.01); *Y02W 10/15* (2015.05); *Y02W 10/30* (2015.05)

(58) Field of Classification Search
USPC ....................................................... 210/606
See application file for complete search history.

(56) References Cited

U.S. PATENT DOCUMENTS

| 3,353,539 | A | * | 11/1967 | Preston ............................ 607/2 |
| 3,994,799 | A | * | 11/1976 | Yao et al. .................... 604/5.04 |
| 4,289,853 | A | * | 9/1981 | Bailey et al. ................. 435/177 |
| 4,604,354 | A | * | 8/1986 | Katz et al. ....................... 435/94 |
| 7,863,028 | B2 | * | 1/2011 | Aneja et al. .................. 435/168 |
| 2004/0253492 | A1 | * | 12/2004 | Vajo ................................. 429/19 |
| 2004/0258736 | A1 | * | 12/2004 | Bequette ...................... 424/442 |
| 2005/0106650 | A1 | * | 5/2005 | Godec ............................. 435/12 |
| 2005/0150832 | A1 | * | 7/2005 | Tsukamoto ................... 210/638 |
| 2009/0127193 | A1 | * | 5/2009 | Updyke ............. A61M 1/1696 210/636 |
| 2012/0189923 | A1 | * | 7/2012 | Hemmes et al. ............. 429/410 |

(Continued)

OTHER PUBLICATIONS

Schussel, Leonard J., et al., "A Urease Bioreactor for Water Reclamation Aboard a manned Spacecraft," Chemosphere: vol. 30, No. 5 pp. 985-994 (1995).*

(Continued)

*Primary Examiner* — Chester T Barry
(74) *Attorney, Agent, or Firm* — Hoglund & Pamias, PSC; Roberto J. Rios

(57) ABSTRACT

The invention presents a urea bio-electrochemical (UBE) system to achieve resource recovery from water recycling systems. A GAC-urease bioreactor was used to recover urea from wastewater stream, and converted to ammonia. Then, the ammonia produced was used to feed an electrochemical cell to gather electrical energy. The invention shows the feasibility of using the UBE system in combination with a forward osmosis subsystem for water reclamation.

3 Claims, 9 Drawing Sheets

(56) References Cited

U.S. PATENT DOCUMENTS

2012/0329642 A1* 12/2012 Shao ............................ 502/177
2014/0023624 A1* 1/2014 Zhou et al. ................. 424/93.7

OTHER PUBLICATIONS

Kraft, Alexander, "Doped Diamond: A Compact Review on a New, Versatile Electrode Material," Int. J. Electrochem. Sci., 2 (2007) 355-385.*

Cath, T. Y., "Lessons Learned from the Development of Advanced Life Support Systems for Space Applications," 2006 International Conference on Environmental Systems, Jul. 17-20, 2006.*

Nicolau, "Biochemical Oxidation of Urea with Urease and Platinized Boron Doped Diamond Electrodes for Water Recycling in Space Applications," ECS Transactions, 33(1):1853-1859, Jan. 2010 (Year: 2010).*

* cited by examiner

UREA-BASED SYSTEM FOR ENERGY AND WASTE RECOVERY IN WATER RECYCLING

GOVERNMENT INTEREST

The claimed invention was made with U.S. Government support under grant numbers NNX09AQ79A AND NNX10AQ17A awarded by the National Aeronautics and Space Administration (NASA). The government has certain rights in this invention.

BACKGROUND OF THE INVENTION

Wastewater reclamation to generate fresh water for consumption and hygiene is of utmost importance for adequate health and sanitation. This is especially true for developing countries were access to clean water is limited. In fact, estimates from the World Health Organization reveals that approximately 1 billion people around the world, mostly in developing countries, have no access to potable water, and 2.6 billion lack access to adequate sanitation. In this sense, the world faces an increasing challenge to meet the demand for potable water. This topic is also important for long-term human missions in space where fresh water for consumption, hygiene and maintenance is necessary. The three sources for wastewater reclamation and reuse in long-term space missions are humidity condensate, hygiene wastewater and human waste, such as urine as shown in Table 1.

TABLE 1

| Source | Mass (kg/person day) |
| --- | --- |
| Hygiene water | 25.3 |
| Humidity condensate | 1.8 |
| Urine + flush | 2.0 |
| Total | 29.1 |

In general, due to the high cost of delivering supplies to space, the recovery of potable water from spacecraft wastewater is critical for life support of crewmembers in long-term missions (i.e. 120-400 days). Of the various consumables required to sustain human life in space, water accounts for the greatest percentage of material by mass. Thus, it is clear that water purification is of extreme importance for future missions to the moon, mars and abroad, but it is also imperative the recovery or recycling of unused contaminants (i.e. separated from the waste stream) into useful resources, a concept known as: in-situ resource utilization.

Water recovery system functions include wastewater collection, stabilization and storage; primary processing; secondary processing including water recovery from brines; post processing, disinfection and potable water storage. Spacecraft crews need between 3.5 and 23.4 kg of water per person for each mission day depending on mission requirements as show in Table 2 below. Conversely, spacecraft crews produce between 3.9 and 23.7 kg of wastewater depending on mission requirements. The state-of-the-art water recovery system on ISS is limited to treating only urine and condensate, which is only about 20% of the potential waste stream on long duration exploration missions which may include hygiene water, laundry water and water recovered from brines and solid wastes.

TABLE 2

| Consumables | Kg/day person/day | Waste | Kg/day person/day |
| --- | --- | --- | --- |
| Gases | 0.8 | Gases | 1.0 |
| Oxygen | 0.84 | Carbon Dioxide | 1.00 |
| Water | 23.4 | Water | 23.7 |
| Drinking | 1.62 | Urine | 1.50 |
| Water content of food | 1.15 | Perspiration/Respiration | 2.28 |
| Food preparation Water | 0.79 | Fecal Water | 0.09 |
| Hygiene Water | 6.82 | Hygiene Water | 6.51 |
| Clothes wash | 12.50 | Clothes wash | 11.90 |
| Urine flush | 0.50 | Urine flush | 0.50 |
|  |  | Humidity Condensate | 0.95 |
| Solids | 0.6 | Solids | 0.2 |
| Food | 0.62 | Urine | 0.06 |
| Soaps & personal products | 0.05 | Feces | 0.03 |
|  |  | Perspiration | 0.02 |
|  |  | Shower & hand wash | 0.02 |
|  |  | Clothes Wash | 0.08 |
| TOTAL | 5 to 25 | TOTAL | 5 to 25 |

Table 2 shows values for spacecraft cabin ECLS, but are not based on any specific mission. Entries and values not shown in italics are fixed quantities determined by human metabolic requirements. Entries and values shown in italics are variable quantities dependent on mission and vehicle requirements.

FIG. 1 illustrates the regenerative Environmental Control and Life Support System (ECLSS) on ISS according to the prior art. Urine is stabilized through the addition of pretreatment chemicals (chromium trioxide and sulfuric acid) at the waste collection system. Water is recovered from the pretreated urine by the Vapor Compression Distillation (VCD) subsystem, within the Urine Processor Assembly (UPA). The UPA is currently operated at a recovery rate of 70% to avoid precipitation, which would result in hardware failure. Urine distillate, the product of the VCD subsystem, together with humidity condensate are then treated through a combination of adsorption/ion exchange processes and thermal catalysis, collectively known as the Water Processing Assembly (WPA). The multi-filtration beds of the WPA are a consumable and must be regularly replaced. While largely successful in recycling water for the ISS, this design requires significant power, stored consumables, is not certified to treat wastewater containing soaps and detergents, and requires toxic and corrosive treatment chemicals.

In 2002 the NASA Advanced Life Support Division (ALS) delineate the chief goal of the program for future manned long duration missions by stating that it is essential to: " . . . provide life support self sufficiency for human beings to carry out research and exploration productively in space for benefits on Earth and to open the door for extended on-orbit stays and planetary exploration". In addition, NASA-ALS highlights that the main objective to fulfill such a goal is: " . . . to develop fully regenerative integrated system technologies that provide air, water and resource recovery from wastes". For short term duration space missions (i.e. 15-20 days) actual NASA waste handling relies on dumping and storage, but waste treatment for missions to Mars and other near-term destinations will be more challenging due to longer mission times. Water is the most massive component aboard and it is estimated that for a long duration mission of four crew members, a total of 1918 g/CM-d of the wastes will become from humans, from which 1562 g/CM-d will be urine, based on a diet of 59 g/CM-d of solid and 1503 g/CM-d of water. Urea (60.0 g/mol) and sodium chloride (58.4 g/mol) are the most predominant wastewater contaminants found in crew urine stream with 36.2% and 21.6%, respectively. One strategy to deal with these contaminants is the reverse osmosis (RO). For instance, Lueptow et al. investigated the rejection performance of several RO membranes used presently for space missions, leading to the conclusion that urea is still hard to reject by such membranes, and accounts for more than the 39% of carbon source from the total dissolved organic carbon (DOC) in transit mission wastewater (TMW). Urea is a very small, uncharged molecule and difficult to reject by either size or charge exclusion.

Another strategy for water reclamation that has been proposed during recent years by NASA is forward osmosis (FO). Forward Osmosis (FO) is a natural process where the osmotic potential between two fluids of differing solute/solvent concentrations equalizes by the movement of solvent from the less concentrated solution to the more concentrated solution, as shown in FIG. 2. Typically this is accomplished through the use of a semi-permeable membrane that separates the two solutions and allows the solvent, but not the solute, to pass through it. The movement of water across this membrane is dictated by the water flux, $J_w$, $$J_w = A(\Delta \pi - \Delta P) \quad (1)$$

where $J_w$ is the water flux, A the water permeability constant of the membrane, $\Delta \pi$ is the osmotic pressure differential and $\Delta P$ is the applied pressure. In the other hand, the osmotic potential, $\pi$, of each solution is, $$\pi = iMRT \quad (2)$$

where i is the dimensionless van't Hoff coefficient, M is the molarity, R is the gas constant and T is the temperature. In FO systems the wastewater, or feed, is passed on one side of the membrane and a hypertonic solution (e.g. NaCl, KCl, $MgCl_2$ etc.), also known as osmotic agent (OA), is passed on the other. The osmotic agent (OA) can use any solute with an osmotic pressure higher than that of the feed and that does not permeate the membrane.

A continuous flow FO process can be achieved by extracting the water that transferred across the membrane into the OA. Treating the OA in a reverse osmosis, distillation, or electrodialysis system can accomplish this. The continuous form of the FO process using an RO system to extract the clean water from the OA as shown in FIG. 3, is referred to as the FO/RO configuration.

Unlike reverse osmosis (RO), which utilizes a hydraulic pressure difference, FO utilizes an osmotic pressure difference as the driving force for water diffusion across the membrane. As long as the ionic potential of water on the permeate side of the membrane is higher than that on the feed side, water will diffuse from the feed side through the semi-permeable membrane and dilute the OA. The feed stream flows are maintained at a very low hydraulic pressure and a high cross flow velocity. Therefore, potential fouling contaminants, such as solids, are not forced into the membrane pore spaces as occurs in the RO process. In 2005 Childress et al. reported on the use of a direct osmotic concentration (DOC) system as pretreatment for a reverse osmosis (RO) unit. This DOC system consisted of a direct (forward) osmosis (DO) unit followed by a second unit consisting of a DO interfaced with an osmotic distillation (OD) step before entering the RO unit. This research demonstrated efficient raw wastewater recovery of 90%, but urea was poorly rejected by the DOC, which can affect the performance of the RO unit subsequently.

Accordingly, one of the main limitations to the FO/RO process is that small polar organic molecules such as urea tend to be poorly rejected by FO and RO membranes. Contaminants such as urea tend to build up in the osmotic agent loop and eventually contaminate the product water. Therefore FO/RO has been limited to the treatment of hygiene water. In order to reject urea, Childress et al. proposed a combined direct osmotic/membrane distillation (DO/MD) and a direct osmotic/membrane osmotic distillation (DO/MOD) system. It was found that with this configurations water flux could be increased by up to 25 times and urea is completely rejected. However, although this approach is useful from a water reclamation standpoint, the use of unused components in a long-term space mission is of critical importance. Perhaps, a strategy to employ resource recovery from urea could provide a more integrated system, while avoiding the complications of membrane-based distillation.

By and large, the use of membranes in spacecraft wastewater treatment has been very limited. This is because small polar organics such as urea tend to be poorly rejected by current membranes. A system able to target urea rejection will allow the use of membranes in the treatment of urine containing wastewater. Currently, membranes are only used to treat hygiene wastewater as they perform well at rejecting surfactants. The implications of this are that one membrane based treatment system can be used that address all waste streams as opposed to having to use two different system and separate plumbing to treat hygiene and urine separately, which is problematic from a mass, power, and volume perspective. Therefore, an integrated system able to reject urea and other small polar compounds while recovering resources is to be the next-generation of water recycling systems for life support systems.

Furthermore a closer look to the other compounds found in wastewater from space mission's revealed that other small polar compounds are in large quantities. Table 3 below presents the wastewater components aboard spacecrafts where can be observed the predominance of alcohols. Therefore, other small polar compounds can be targeted to generate a cleaner environment aboard a spacecraft.

TABLE 3

| Wastewater component | Quantity |
| --- | --- |
| Hygiene wastewater | 1.2 g/L |
| Humidity condensate | 0.62 mL/L |
| Ethanol | 117.98 g/L |
| 2-propanol | 31.87 g/L |
| 1,2-propanediol | 65.04 g/L |
| Caprolactam | 23.74 g/L |
| 2-(2-Butoxyethoxy) | 3.43 g/L |
| Methanol | 3.85 g/L |
| Formaldehyde | 6.82 g/L |
| Formic acid | 14.02 g/L |
| Propionic acid | 19.95 g/L |
| Zinc acetate dihydrate | 6.53 g/L |
| Ammonium bicarbonate | 39.96 g/L |
| Ammonium carbonate | 29.87 g/L |
| Urine | |
| Urea | 5 g/L |

Therefore, the integration of FO systems along with urea rejection or degradation technology could produce a FO/RO system that could treat urine-containing wastewater. Recent investigations have evaluated the potential of integrating forward osmosis along with biological/electrochemical technology for the treatment of wastewater and electricity generation. For example, Zhang et al. reported on the integration of a FO system into a microbial fuel cell for wastewater treatment and energy generation. This work demonstrated enhanced water flux with a power output of 4.74 W/m$^{3}$' showing it to be a feasible approach. Also, other researchers have focused on the development of osmotic membrane bioreactor for wastewater reuse, demonstrating that is a feasible and economically viable approach.

Thus, what is needed is a novel and efficient system to treat human wastewater generated inboard long duration human spacecraft.

SUMMARY OF THE INVENTION

According to an aspect of the invention, a Urea-based system is provided for energy and waste recovery in water recycling.

According to one aspect of the invention, a forward osmosis/reverse osmosis system receives wastewater and provides water and urea;

According to another aspect of the invention, a bioreactor receives said urea and provides ammonia.

According to still another aspect of the invention, an electrochemical cell receives said ammonia and provides electrical energy from said ammonia.

According to one aspect of the invention, the bioreactor allows said urea to react with granulated activated carbon with previously immobilized urease to produce said ammonia.

According to an aspect of the invention, the electrochemical cell allows said ammonia to be electrochemically oxidized at the interface of a platinized boron-doped diamond electrode to generate current.

According to another aspect of the invention, a method for energy and waste recovery in water recycling allows urea/urine to react with granulated activated carbon with previously immobilized urease (GAC-urease); and electrochemically oxidizes the product of said reaction at the interface of a platinized boron-doped diamond electrode to generate current.

BRIEF DESCRIPTION OF THE DRAWINGS

Further features and advantages of the invention will become apparent from the following detailed description taken in conjunction with the accompanying figures showing illustrative embodiments of the invention, in which.

DETAILED DESCRIPTION OF THE INVENTION

Figure 1:
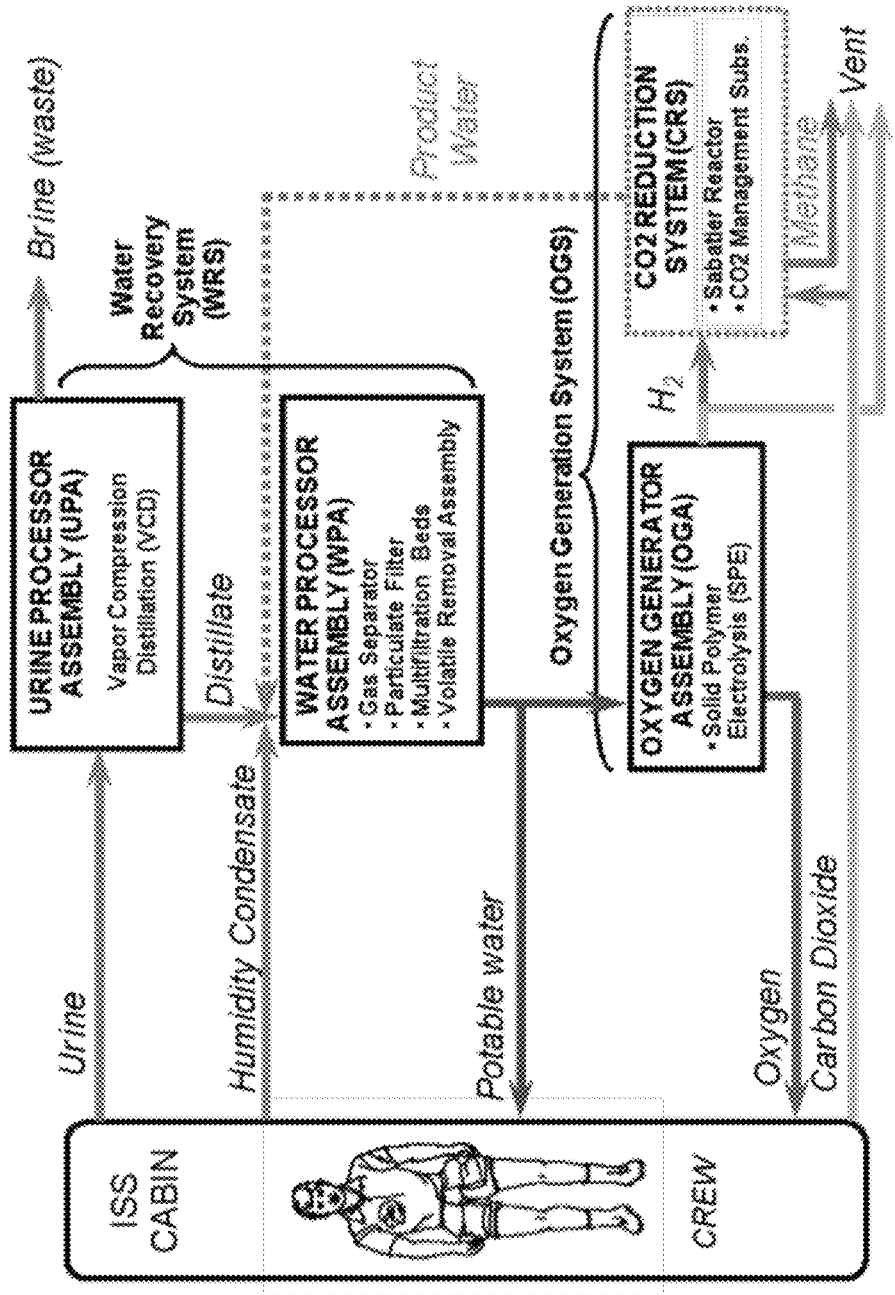
FIG. 1 illustrates the regenerative Environmental Control and Life Support System (ECLSS) on ISS according to the prior art.
Figure 2:
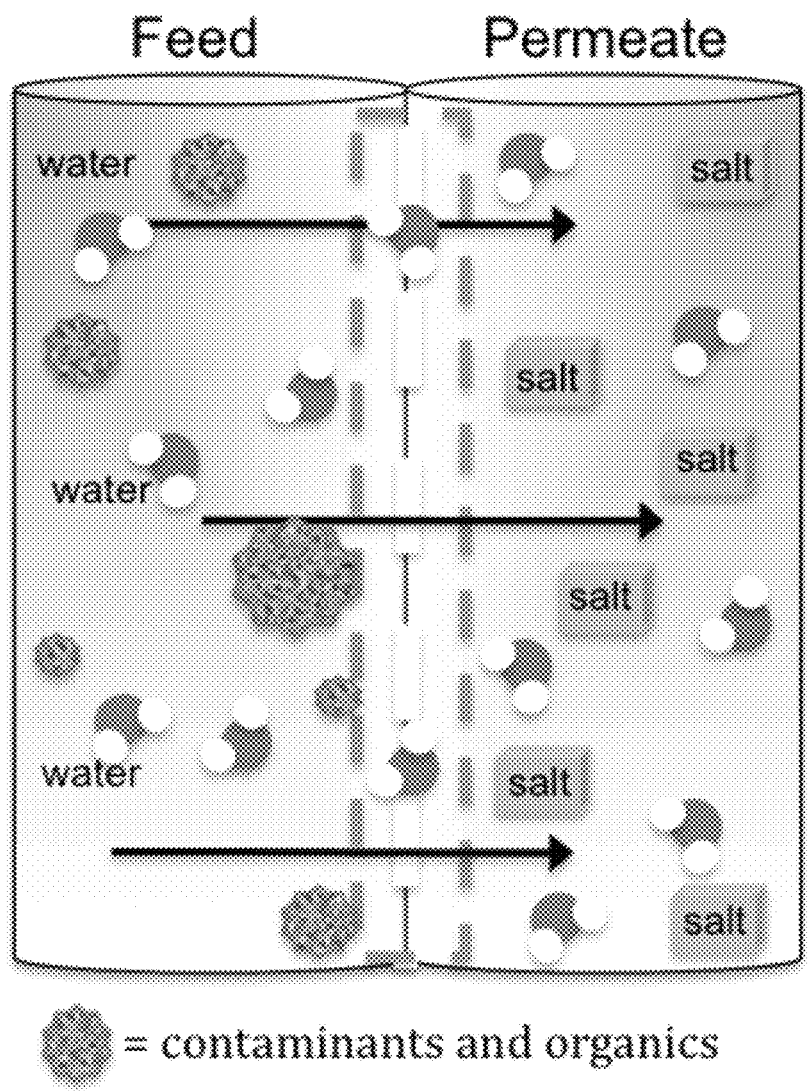
FIG. 2 illustrates the Forward Osmosis (FO) process according to the invention.
Figure 3:
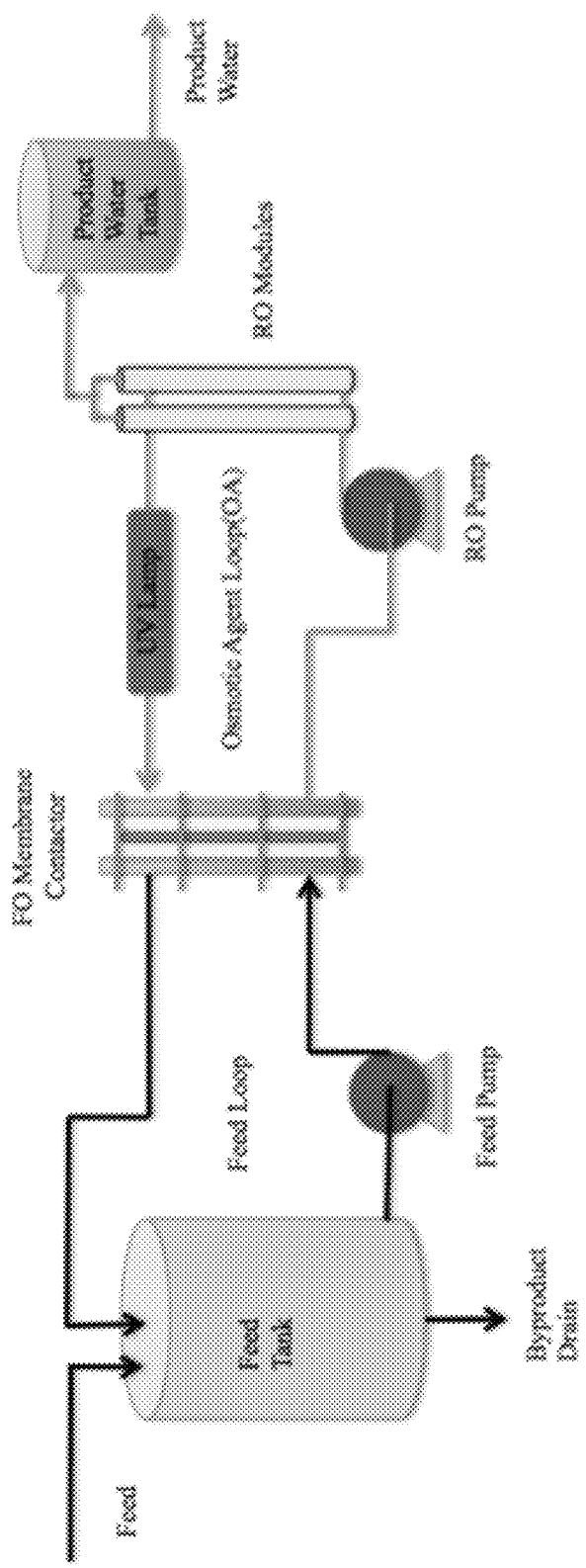
FIG. 3 illustrates a simplified FO/RO diagram for water reclamation.
Figure 4:
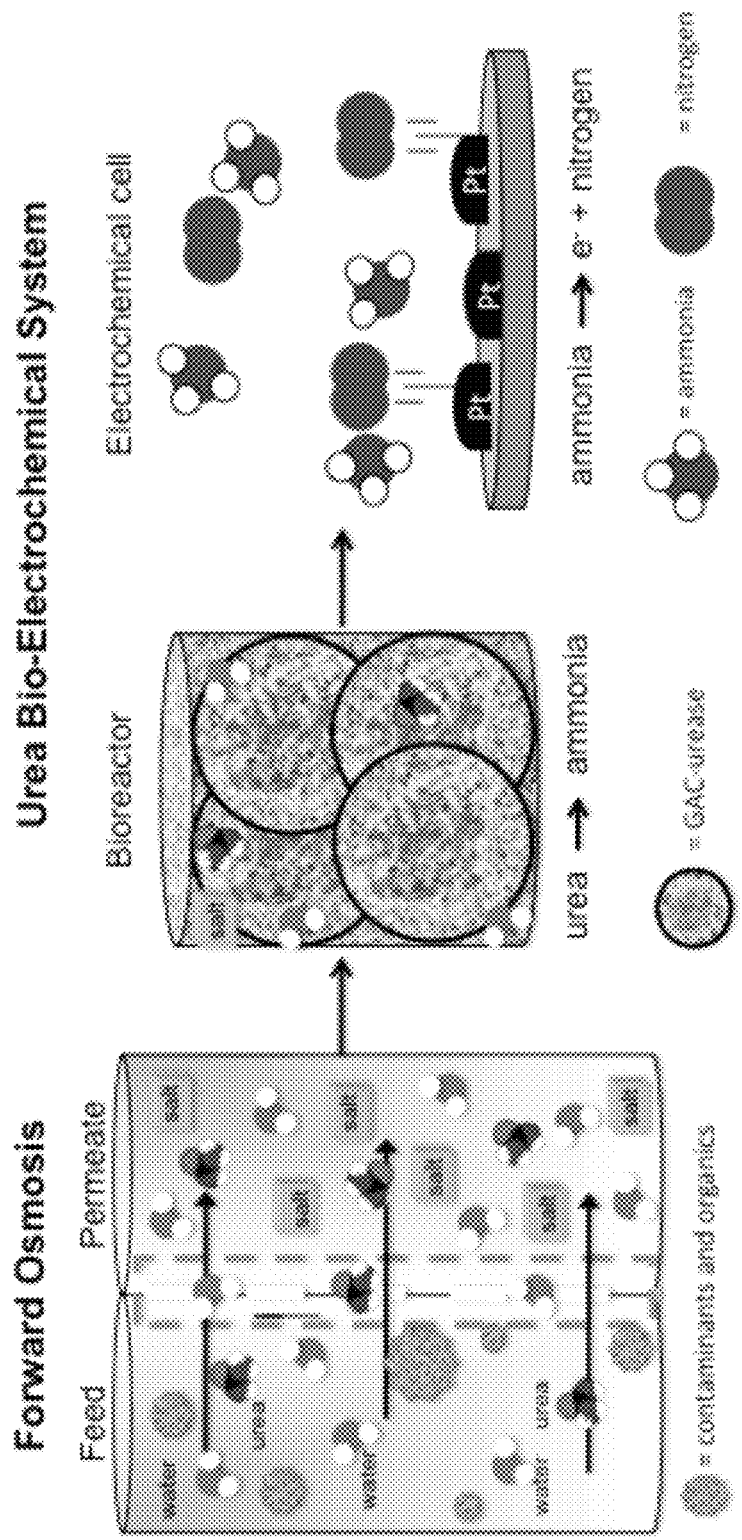
FIG. 4 illustrates the two-step FO-UBE system according to the present invention
Figure 9:
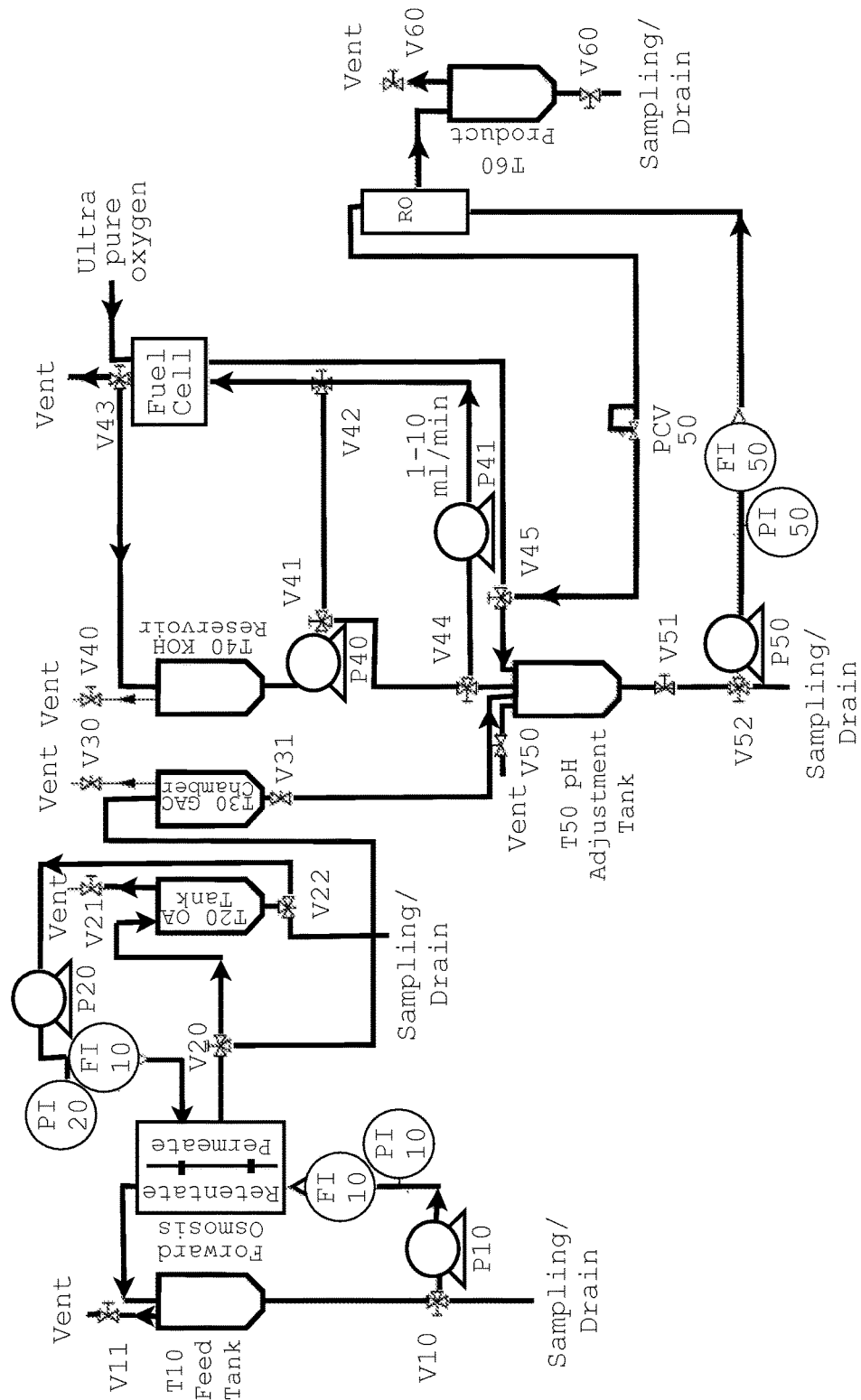
FIG. 9 is a schematic of the two-step FO-UBE system according to the present invention Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

The present invention proposes an interface of a FO system along with a bioreactor and an electrochemical cell, designed to treat human wastewater generated inboard long duration human spacecraft. The urea bioreactor/electrochemical system (UBE) externally interfaced to a FO system (FO-UBE) is shown in FIG. 4 and FIG. 9. One key element of the FOBE is a direct alkaline ammonia fuel cell (DAAFC). This DAAFC is the element where the ammonia from the bioreactor will be electrooxidized to generate electrical current.

The UBE of the present invention consists of a two-step process where urea/urine is allowed to react with granulated activated carbon with previously immobilized urease (GAC-urease), while the product of the enzymatic reaction is electrochemically oxidized at the interface of a platinized boron-doped diamond electrode to generate current. Urease (EC 3.5.1.5, urea amidohydrolase) is a nickel metalloenzyme that catalyzes the hydrolysis of urea to produce two moles of ammonia and carbonic acid as shown in Equation 3.

$$CO(NH_2)_2 + 2H_2O \xrightarrow{\text{Urease}} 2NH_3 + H_2CO_3 \qquad (3)$$

Atwater et al. (1995) immobilized urease in diatomaceous earth while urea was continuously fed into the bioreactor and the byproducts were discarded. In the UBE, urea content in the liquid is used as a biofuel to generate ammonia, a high energy density molecule, to feed an electrochemical cell made of platinized boron-doped diamond electrodes. This electrochemical cell will be able to oxidize the ammonia molecules in solution to extract up to 6 electrons for every two ammonia molecules as shown in Equation 4, and producing molecular nitrogen and water.

$$2NH_3 + 6OH^- \rightarrow N_2 + 6H_2O + 6e^- \qquad (4)$$

Ammonia has been considered suitable to be used as an alternative fuel due to its high energy density (12.6 MJ L-1) and easiness of storage and transportation in comparison to hydrogen. For this reason, recent investigations have focused on the development of catalyst for electrolyzers, and microreactors applications for the production of hydrogen from ammonia or as direct ammonia fuel cell devices. Thus, the present invention has broad applicability to terrestrial wastewater treatment and alternative energy generation applications.

Results and Discussion

Assessment and Optimization of UBE System

Figure 5:
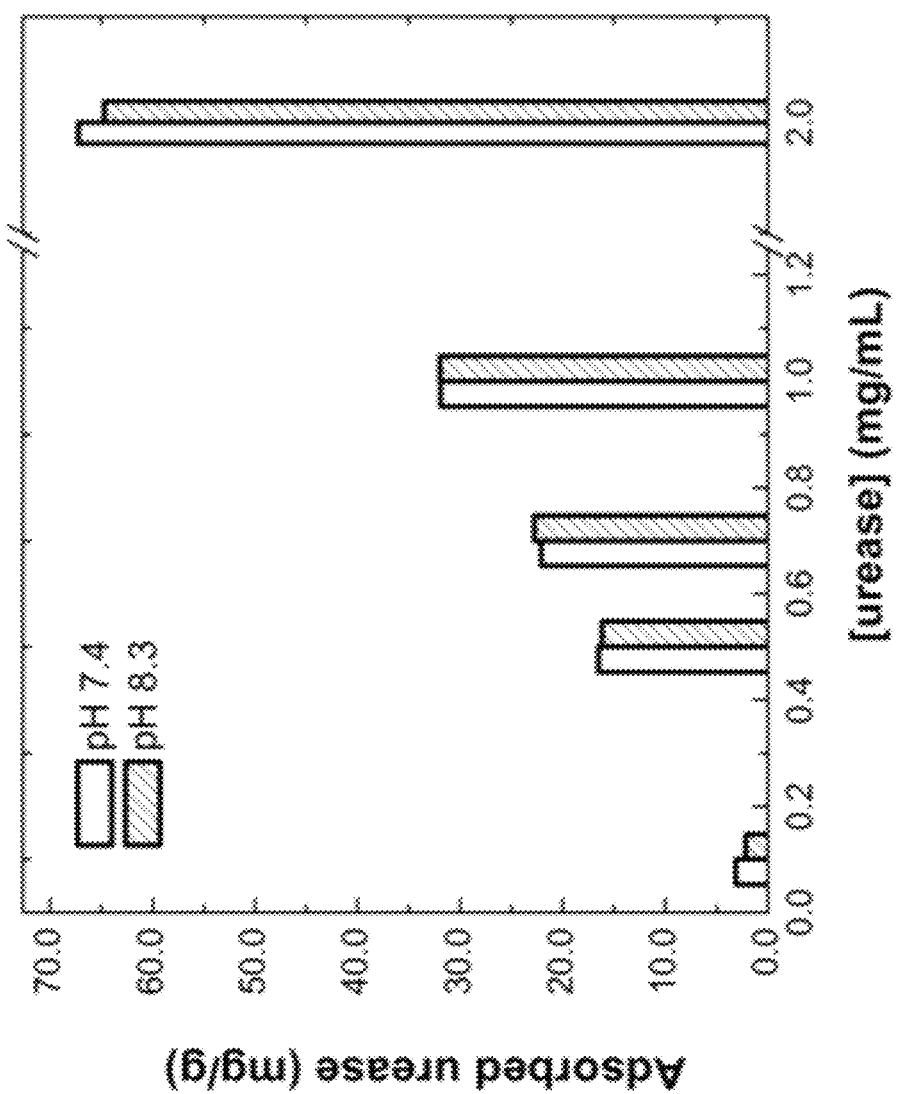
FIG. 5 shows a plot of adsorbed urease as a function of urease initial concentration ranging according to the present invention.

First, the enzyme urease was immobilized onto GAC at a pH of 7.4 and 8.3 in a phosphate buffer solution to test possible pH dependency. The immobilization process was carried out at room temperature for 2 h and the results are shown in FIG. 5, which shows that only slight differences are observed in the immobilization of urease into GAC at both pH values. Therefore, pH 7.4 was selected for any further immobilization to the protein's optimum pH. In this way the possible residual activity of the enzyme is maximized.

Once the urease-GAC composite was constructed at pH 7.4, the immobilized enzyme activity was measured. For instance, a 36% of residual activity was obtained in comparison to the enzyme free in phosphate buffer solution. This decrease in enzyme activity is possibly due to protein denaturation when in contact with the GAC hydrophobic core. However, when the residual activity of the immobilized enzyme is measured after two weeks, a 97% of the urease-GAC initial activity is retained. These findings indicate that the GAC structure is suitable for the immobilization of the protein urease and that long-term activity can be achieved. Previous investigations with urease in petroleum-based spherical activated charcoal found that about 20% of the carbon pores are enzyme occupied and high residual activities are obtained. The reason for high residual activities is ascribed to the similarities between the structure provided by the carbon material, and the membrane-based pockets that holds proteins in their natural state.

Figure 6:
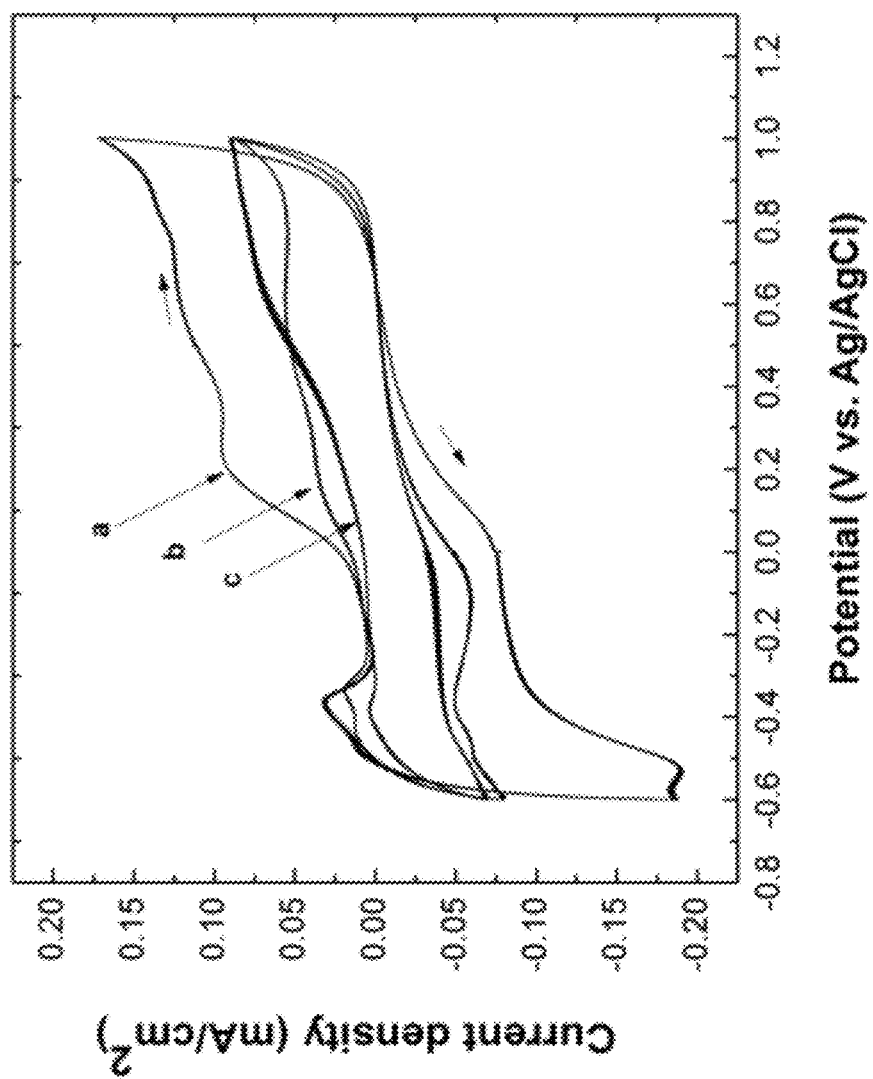
FIG. 6 shows a cyclic voltammogram plot according to the present invention.

Once the initial conditions for the GAC-urease composite were investigated, the GAC-urease system (i.e. urea bioreactor) was scaled-up for the actual urea bioreactor experiments. For the initial urea bioreactor experiments, a urea solution (containing analytical quantities of 13,400 mg/L urea, sodium chloride 8,001 mg/L and potassium chloride, 1,641 mg/L) was used to perform a contact time experiment. These components were selected to mimic the main chemicals and quantities found in humane urine. Therefore, two urea bioreactors (and two blanks) were set and after one and four hours of enzymatic reaction with the urea solution, the supernatants were withdrawn and the amount of ammonia produced was measured. The results revealed that after four hours 379 mg/mL of ammonia were produced (pH 9.3), resulting in 40% higher ammonia concentration than the 1-hour reaction (pH 8.9). Moreover, a 72-hour experiment was also performed and the ammonia concentration resulted in 231 mg/L, suggesting that after certain period of time the ammonia molecules are re-adsorbed from the bulk solution by the granulated activated carbon. These supernatants were also used to test the electrochemical cell system behavior after the bioreactor step. Before evaluating the ammonia-containing samples from the bioreactor, a series of standards for urea, ammonia and the buffer were submitted to the electrochemical cell system. A cyclic voltammogram, presenting the current density (i.e. $mA/cm^2$) as a function of voltage (i.e. V vs. Ag/AgCl), for a 0.1 M urea solution and 0.1 M ammonium sulfate solution and 0.1 M phosphate buffer solution, all at pH 8.3 were performed as shown in FIG. 6. Such pH was selected as an intermediate value between the enzyme optimum pH and the final pH values observed in the bioreactors. From this figure, it is noticeable a peak signal appearing at ca. 0.10-0.20 V vs. Ag/AgCl for the ammonium sulfate solution (FIG. 6-a), and is ascribed to the ammonia electrooxidation. As can be observed, neither for the buffer solution (FIG. 6-b) nor for the urea solution (FIG. 6-c) the peak is observed, which further confirms the previous results.

Figure 7:
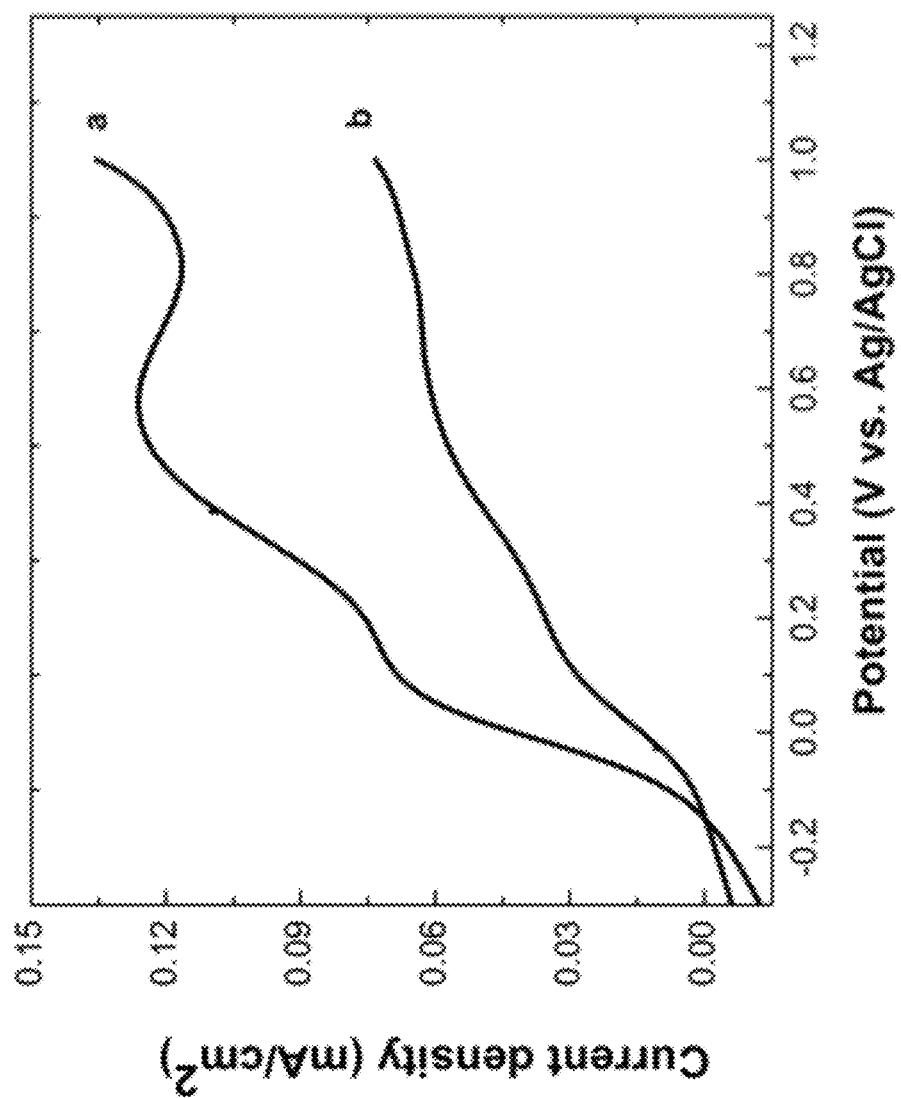
FIG. 7 shows a plot of linear polarization for the bioreactor product according to the present invention.

The cyclic voltammogram for the bioreactor samples (i.e. bioreactor product) after one and four hours of contact with the urea solution (i.e. containing analytical quantities of 13,400 mg/L urea, sodium chloride 8,001 mg/L and potassium chloride, 1,641 mg/L) were performed as shown in FIG. 7. It can be observed from this figure the appearance of an electrochemical signal at ca. 0.1 V vs. Ag/AgCl that is ascribed to the electrooxidation of ammonia. It is clear that a four-hour (FIG. 7-a) period of contact time promotes the formation of ammonia molecules, which results in higher current densities. The three-hour difference represents a 40% increment in the ammonia electrooxidation current. This is consistent with the difference in concentration of aqueous ammonia measured previously at one and four hours of reaction. Therefore, a 4 h reaction time of the urea containing solution with the bioreactor is selected for further experiments.

Externally Interfaced FO-UBE System

The invention explores and determines the position where the UBE system would be allocated to degrade urea to ammonia, while ammonia is oxidized to nitrogen and electrical power. The FO/RO samples where generated by processing 88 L of ersatz solution at a 95% water recovery rate. Samples at two different stages in the water recycling process were used for the UBE experiments (i.e. feed and permeate solution). Table 4 presents the analytical quantities of urea and ammonia for each sample (i.e. initial). The feed and permeate solutions were allowed to react with the bioreactor system for 4 h and the supernatants were subtracted afterwards. The analytical quantities of ammonia and urea were determined. In Table 4 the urea rejection or removal and ammonia production after the bioreactor reaction are presented (i.e. bioreactor).

TABLE 4

| | Component | Feed | Permeate (draw) |
|---|---|---|---|
| [Urea] mg/L | Initial | 15,946 | 204.6 |
| | Bioreactor | 12,434 | 87.9 |
| | % urea rejection | 27% | 57% |
| [ammonia] mg/L | Initial | 10.541 | 87.6 |
| | Bioreactor | 10,416 | 145.8 |
| | % ammonia rejection | — | 40% |
| TOC mg/L | Initial | 4,769.0 | 2,491.0 |
| | Bioreactor | 912.0 | 264.6 |
| | % TOC reduction | 80.9% | 89.4% |

Figure 8:
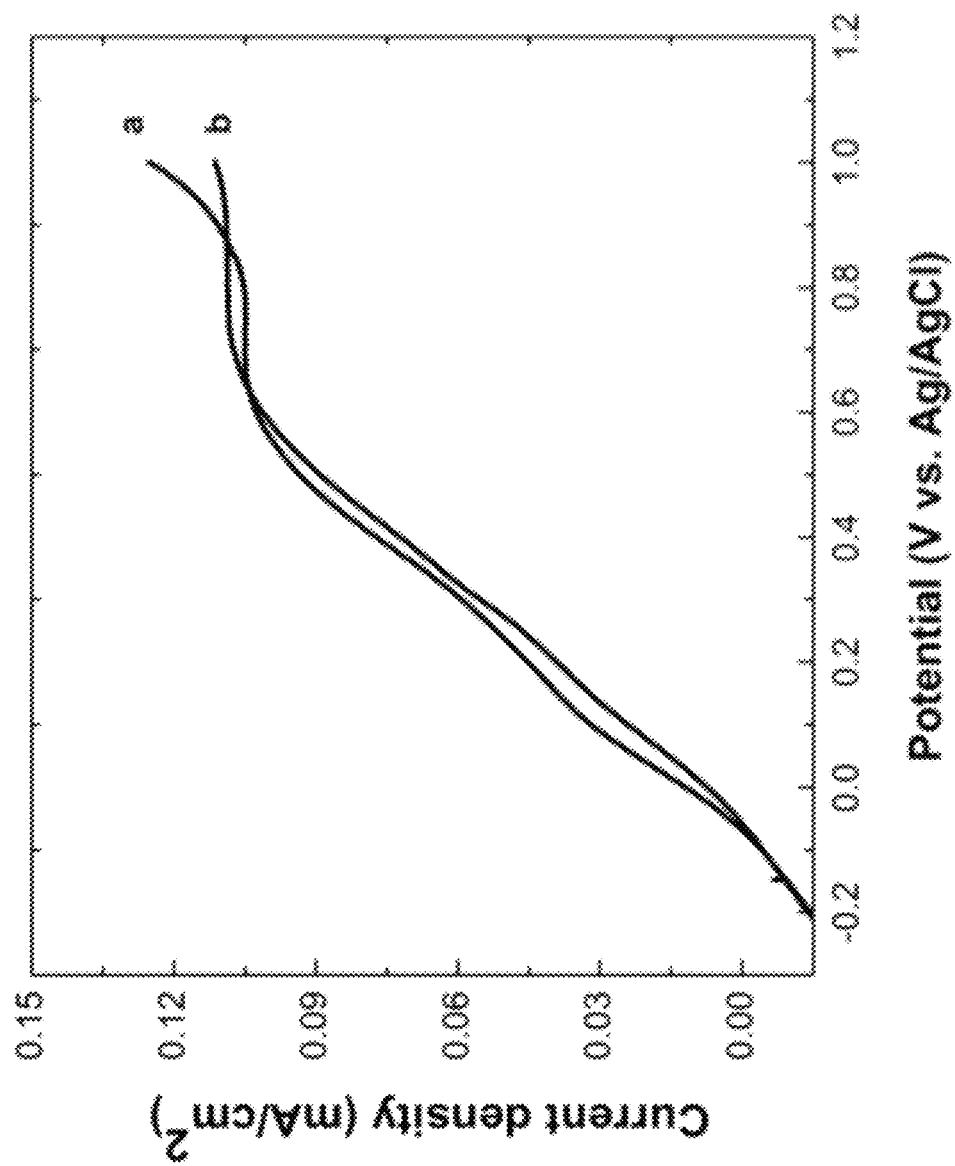
FIG. 8 shows a plot of linear polarization for the bioreactor product after forward osmosis according to the present invention.

From this table, it is noticeable the 22% and 57% urea rejection for the feed and permeate solutions respectively after the bio-reaction. These results suggest that the 22% urea rejection in the feed solution represents the contribution of adsorbed urea into the empty spaces of the GAC and the enzymatic hydrolysis of urea. However, it can be noted that ammonia production (i.e. urea recovery) was not achieved. This may be the consequence of an extreme enzyme degradation or inactivation due competitive inhibition with other chemicals present in the feed solution. Conversely, for the permeate solution sample the urea rejection was 57% with an ammonia production of 40%. For instance, the difference between the initial ammonia concentration from the permeate solution and after the bioreactor is 58.2 mg/mL, which is ascribed to come from the bioreactor process (i.e. urea degradation to ammonia). Hence, if the urea removed (116.7 mg/L) from the permeate solution is assume to be all converted to ammonia in the bioreactor, then 66.0 mg/L $NH_3$ must be present after the bioreactor process (i.e. taking the molar masses and stoichiometry between both compounds), which provides the bioreactor an efficiency of 88% for the degradation of urea to ammonia when employing the permeate solution. Then, the feed and permeate solution samples were submitted to the electrochemical process as shown in FIG. 8 where it is shown linear polarization for the bioreactor product after forward osmosis for the permeate solution sample (a) and feed solution (b) after 4 h of bioreaction in Pt-BDD electrode at 25 mV/s.

In this figure (FIG. 8-$a$) represents the electrochemical oxidation of the permeate solution, where an oxidation signal can be observed at ca. 0.1 V vs. Ag/AgCl, which corresponds to the ammonia electrooxidation. The experimental charge transferred during this electrochemical oxidation process is 10.29 $\mu C/cm^2$. In contrast, the feed cyclic voltammogram (FIG. 8-$b$) shows nearly no current generation even when the analytical amount of ammonia in this sample is 10,416.5 mg/L, which clearly suggest a passivation process occurring in the catalysts. These results suggest that the feed solution contains components that make this step unsuitable for the UBE system. These results indicate that the UBE system would be ideal after the permeate solution to achieve higher efficiency. Finally, the total organic carbon before and after the bioreactor process was determined for the feed and permeate solution, Table 4. As can be observed, after the bioreactor TOC concentration is reduced to ca. 10% in the permeate solution. The results show that the ideal place to the biofuel cell reactor is after the FO subsystem in the permeate solution as demonstrated.

The present invention presents a urea bio-electrochemical (UBE) system to achieve resource recovery from water recycling systems. A GAC-urease bioreactor was used to recover urea from wastewater stream, and converted to ammonia. Then, the ammonia produced was used to feed an electrochemical cell to gather electrical energy. The results of this work showed the feasibility of using the UBE system in combination with a forward osmosis subsystem for water reclamation. For instance, the UBE reactor in combination with the FO system presented an overall efficiency higher than 80.0% for the removal of organic carbons. Also, the urea recovery with the GAC-urease system was shown to be around 86%. The use of membranes in spacecraft wastewater treatment has been very limited. This is because small polar organics such as urea tend to be poorly rejected by these membranes. This system address this issue by providing a method of targeting urea and removing it as $N_2$ while generating electrical current. This will allow the use of membranes in the treatment of urine containing wastewater. Currently, membranes are used to treat only hygiene wastewater as they perform well in rejecting soaps. The broad implications of this research is that one membrane-based treatment system can be used that address all waste streams as opposed to having to use two different system and separate plumbing to treat hygiene and urine separately, which is problematic from a mass, power and volume perspective. Terrestrially, membrane based water treatment is outpacing all other methods of water treatment. The development of this system will allow NASA to benefit from this research and all the membrane based water treatment product developed for terrestrial applications. The present invention recycles wastewater from human waste, while generating useful resources. Moreover, as discussed, the FOBE technology will allow the use of membrane-based water reclamation system to treat hygiene and urine containing wastewater, which up to date has never been addressed by the division.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A Urea-based system for energy and waste recovery in water recycling comprising:
    a forward osmosis unit having a feed side receiving wastewater and a permeate side providing a urea-containing solution;
    a reverse osmosis unit connected to said forward osmosis unit, said reverse osmosis unit providing potable water;
    a bioreactor connected between said reverse osmosis unit and the permeate side of said forward osmosis unit, said bioreactor generating ammonia from said urea-containing solution; and
    an electrochemical cell receiving said generated ammonia and generating electrical energy from said ammonia.

2. The system of claim 1, wherein the urea-containing solution is reacted with granulated activated carbon previously immobilized with urease to generate said ammonia.

3. The method of claim 1, wherein the ammonia received at said electrochemical cell is electrochemically oxidized at a direct ammonia alkaline fuel cell to generate energy.

* * * * *